(12) United States Patent
Wetherell et al.

(10) Patent No.: US 11,567,982 B2
(45) Date of Patent: *Jan. 31, 2023

(54) SYSTEMS AND METHODS FOR PROCESSING AND ORGANIZING ELECTRONIC CONTENT

(71) Applicant: Yahoo Assets LLC, Dulles, VA (US)

(72) Inventors: William Wetherell, San Francisco, CA (US); Joshua S. Ramirez, Los Gatos, CA (US); Marc A. Katchay, Washington, DC (US); Gabriela Meirelles Moore, Brooklyn, NY (US); David Louie, Mountain View, CA (US); Douglas Hamman, San Mateo, CA (US); Brian Behnke, Mountain View, CA (US); Kiersten L. Lammerding, Sunnyvale, CA (US)

(73) Assignee: Yahoo Assets LLC, Dulles, VA (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/685,716

(22) Filed: Nov. 15, 2019

(65) Prior Publication Data
US 2020/0081910 A1 Mar. 12, 2020

Related U.S. Application Data

(63) Continuation of application No. 15/787,385, filed on Oct. 18, 2017, now Pat. No. 10,515,107, which is a
(Continued)

(51) Int. Cl.
*G06F 17/00* (2019.01)
*G06F 16/35* (2019.01)
(Continued)

(52) U.S. Cl.
CPC ............ *G06F 16/35* (2019.01); *G06F 3/0486* (2013.01); *G06F 3/04817* (2013.01); *G06Q 10/107* (2013.01)

(58) Field of Classification Search
None
See application file for complete search history.

(56) References Cited

U.S. PATENT DOCUMENTS

| 5,742,508 A * | 4/1998 | Kusui | G01S 13/91 342/36 |
| 5,878,398 A | 3/1999 | Tokuda | |

(Continued)

OTHER PUBLICATIONS

International Search Report and Written Opinion issued in PCT International No. PCT/US2013/041977, dated Oct. 23, 2013 (12 pages total).
(Continued)

*Primary Examiner* — Hasanul Mobin
(74) *Attorney, Agent, or Firm* — Bookoff McAndrews, PLLC

(57) ABSTRACT

The present disclosure generally relates to processing and organizing electronic content. In accordance with one implementation, a computer-implemented method is provided that comprises receiving source data from at least one content server, the source data being associated with electronic content. The method also includes generating local data based on at least one of an analysis of the received source data or an extraction from the received source data. Additionally, the method includes classifying the electronic content as being associated with one or more content stacks. Further, the method includes generating representations of the electronic content based on the local data and generating instructions to display at least one content stack on a user interface, each displayed contact stack being operable to
(Continued)

display one or more of the representations of the electronic content associated with the content stack based on the classification.

20 Claims, 9 Drawing Sheets

Related U.S. Application Data continuation of application No. 13/886,211, filed on May 2, 2013, now Pat. No. 9,811,586.

(60) Provisional application No. 61/794,993, filed on Mar. 15, 2013, provisional application No. 61/715,290, filed on Oct. 18, 2012.

(51) Int. Cl.
  *G06Q 10/10* (2012.01)
  *G06F 3/04817* (2022.01)
  *G06F 3/0486* (2013.01)

(56) References Cited

U.S. PATENT DOCUMENTS

| | | | |
|---|---|---|---|
| 5,917,489 A | 6/1999 | Thurlow et al. | |
| 5,956,029 A | 9/1999 | Okada et al. | |
| D418,120 S | 12/1999 | Ohkura et al. | |
| 6,128,009 A | 10/2000 | Ohkura et al. | |
| 6,161,130 A | 12/2000 | Horvitz | |
| 6,243,724 B1 | 6/2001 | Mantier et al. | |
| 6,392,640 B1 | 5/2002 | Will | |
| 6,421,709 B1 | 7/2002 | McCormick | |
| 6,809,724 B1 | 10/2004 | Shiraishi | |
| 6,842,775 B1 | 1/2005 | Chastain | |
| D528,553 S | 9/2006 | Nevill-Manning et al. | |
| 7,428,708 B2 | 9/2008 | Okamoto | |
| 7,468,729 B1 | 12/2008 | Levinson | |
| 7,703,031 B2 | 4/2010 | Nakagawa et al. | |
| 7,765,212 B2 | 7/2010 | Surendran et al. | |
| 8,046,705 B2 | 10/2011 | Hunleth et al. | |
| 8,082,008 B2 | 12/2011 | Hoffman et al. | |
| D656,508 S | 3/2012 | Makhlouf | |
| 8,179,404 B2 | 5/2012 | Nagatomo | |
| 8,533,283 B2 * | 9/2013 | Shuster | H04L 67/01 709/219 |
| D740,299 S | 10/2015 | Wetherall et al. | |
| 2002/0049847 A1 * | 4/2002 | McArdle | G06Q 10/10 709/227 |
| 2002/0054112 A1 | 5/2002 | Hasegawa et al. | |
| 2002/0056083 A1 | 5/2002 | Istvan | |
| 2002/0099777 A1 | 7/2002 | Gupta et al. | |
| 2002/0169954 A1 | 11/2002 | Bandini | |
| 2003/0023427 A1 * | 1/2003 | Cassin | H04N 21/8456 348/E7.071 |
| 2003/0210278 A1 | 11/2003 | Kyoya et al. | |
| 2004/0003283 A1 | 1/2004 | Goodman | |
| 2004/0015775 A1 | 1/2004 | Simske | |
| 2004/0267893 A1 | 12/2004 | Lin | |
| 2005/0193068 A1 * | 9/2005 | Brown | G06Q 10/107 709/206 |
| 2005/0198153 A1 | 9/2005 | Keohane | |
| 2005/0251758 A1 | 11/2005 | Cummins et al. | |
| 2006/0075339 A1 | 4/2006 | Tomita | |
| 2006/0232695 A1 | 10/2006 | Yuasa | |
| 2006/0288015 A1 | 12/2006 | Schirripa | |
| 2006/0288304 A1 | 12/2006 | Nomoto et al. | |
| 2007/0022071 A1 * | 1/2007 | Mullender | G06F 16/957 707/E17.135 |
| 2007/0050722 A1 | 3/2007 | Schulz et al. | |
| 2007/0156783 A1 | 7/2007 | Zbogar-Smith | |
| 2007/0168266 A1 | 7/2007 | Questembert | |
| 2008/0095336 A1 | 4/2008 | Tysowski et al. | |
| 2008/0147790 A1 * | 6/2008 | Malaney | G06Q 10/00 709/203 |
| 2008/0163059 A1 | 7/2008 | Craner | |
| 2008/0282190 A1 | 11/2008 | Kagaya | |
| 2008/0307343 A1 * | 12/2008 | Robert | G06F 3/04817 715/765 |
| 2009/0044131 A1 | 2/2009 | Pylappan | |
| 2009/0254624 A1 | 10/2009 | Baudin | |
| 2009/0288028 A1 | 11/2009 | Gohda | |
| 2009/0322790 A1 * | 12/2009 | Behar | G06F 1/1677 715/810 |
| 2010/0271373 A1 * | 10/2010 | Edgar | H04R 25/70 381/60 |
| 2011/0126249 A1 | 5/2011 | Makhlouf | |
| 2011/0137894 A1 | 6/2011 | Narayanan et al. | |
| 2011/0296351 A1 * | 12/2011 | Ewing, Jr. | G06F 3/04815 715/854 |
| 2011/0307804 A1 | 12/2011 | Spierer | |
| 2012/0054673 A1 | 3/2012 | Kim et al. | |
| 2012/0209922 A1 | 8/2012 | Bhatia | |
| 2013/0030905 A1 * | 1/2013 | Fuloria | G06Q 50/01 705/14.39 |
| 2013/0042183 A1 | 2/2013 | Martinez | |
| 2013/0054613 A1 | 2/2013 | Bishop | |
| 2013/0067389 A1 | 3/2013 | Jin | |
| 2013/0085807 A1 | 4/2013 | Cincotta | |
| 2013/0139102 A1 | 5/2013 | Miura et al. | |
| 2013/0159899 A1 | 6/2013 | Martino Pena et al. | |
| 2013/0159903 A1 | 6/2013 | Yu et al. | |
| 2013/0167031 A1 * | 6/2013 | Inada | G06T 3/4092 715/716 |
| 2013/0179561 A1 | 7/2013 | Tripathi | |
| 2013/0254710 A1 | 9/2013 | Banti | |
| 2013/0290442 A1 | 10/2013 | Dgani | |
| 2013/0290863 A1 | 10/2013 | Chen | |
| 2014/0075361 A1 | 3/2014 | Reynolds et al. | |
| 2014/0082495 A1 | 3/2014 | Estes et al. | |
| 2014/0101583 A1 | 4/2014 | Jeong et al. | |
| 2014/0108995 A1 | 4/2014 | Sandler et al. | |
| 2014/0115455 A1 | 4/2014 | Kim | |
| 2014/0115483 A1 | 4/2014 | Wetherell et al. | |
| 2014/0115495 A1 | 4/2014 | Wetherell et al. | |
| 2014/0115536 A1 | 4/2014 | Akiya et al. | |
| 2014/0189574 A1 | 7/2014 | Stallings et al. | |
| 2014/0282150 A1 | 9/2014 | Wagner | |
| 2014/0282153 A1 | 9/2014 | Christiansen et al. | |
| 2014/0288967 A1 | 9/2014 | Bailes | |
| 2014/0325402 A1 | 10/2014 | Jung et al. | |
| 2014/0344925 A1 | 11/2014 | Muthiah | |

OTHER PUBLICATIONS

U.S. Appl. No. 13/886,192, filed May 2, 2013, Systems and Methods for Processing and Organizing Electronic Content.
U.S. Appl. No. 13/886,221, filed May 2, 2013, Systems and Methods for Processing and Organizing Electronic Content.

* cited by examiner

FIG. 5D

SYSTEMS AND METHODS FOR PROCESSING AND ORGANIZING ELECTRONIC CONTENT

CROSS-REFERENCE TO RELATED APPLICATION(S)

This application is a continuation of and claims the benefit of priority to U.S. patent application Ser. No. 15/787,385, filed on Oct. 18, 2017, which is a continuation of and claims the benefit of priority to U.S. patent application Ser. No. 13/886,211, filed on May 2, 2013, now U.S. Pat. No. 9,811,586, which claims the benefit of priority to U.S. Provisional Patent Application No. 61/715,290 filed on Oct. 18, 2012 and U.S. Provisional Application No. 61/794,933 filed Mar. 15, 2013, all of which are incorporated herein by reference in their entirety.

BACKGROUND

Technical Field

The present disclosure generally relates systems and methods for processing and organizing electronic content. In particular, and without limitation, the present disclosure relates to computerized systems and methods for processing and organizing electronic content, such as e-mail, in content stacks based on the classification of the electronic content. The content stacks may be electronically displayed or presented to a user.

Background

Today, electronic content exists in many forms and for different purposes. In addition, users may view and analyze electronic content through various forms of devices, including computers, laptops, mobile phones, smartphones, and personal digital assistants. For example, e-mail was originally designed for electronic communications, but today, e-mail is used for many other things (e.g., to-do lists, file archives, content consumption, contact management, and the like). These uses of e-mail, coupled with the proliferation of other electronic content, including social networking messages, text messages, e-commerce, and e-mail marketing, have resulted in cluttered inboxes, missed e-mails or messages, and lost productivity as users struggle to organize and manage e-mail and other electronic content appropriately.

Various techniques have been proposed for organizing and presenting electronic content. For example, some e-mail systems apply rules to categorize and highlight e-mails. These rules may be used to automatically move e-mail messages to a particular folder or highlight an urgent e-mail. Additionally, filters, foldering, labeling, and tagging have all been proposed in systems and applications that attempt to provide electronic content in an organized manner for users. However, many of these approaches require a high level of cognitive processing and/or significant manual intervention by users. In addition, some of these approaches generate unnecessary clutter or undecipherable information, making it difficult for users to efficiently view and analyze electronic content.

Accordingly, there is a need for improved systems and methods for processing and organizing electronic content, including e-mail, electronic messages, and other forms of electronic content. Moreover, there is a need for improved solutions for organizing and managing electronic content in a manner that is smart, dynamic, and visual, and addresses the needs of users.

SUMMARY

Embodiments consistent with the present disclosure provide for processing and organizing of electronic content. Moreover, embodiments consistent with the present disclosure include computerized systems and methods for providing for display of electronic content, such as e-mail, in content stacks based on the classification of the electronic content.

In accordance with some embodiments, a computer-implemented method is disclosed for providing content stacks for electronic content. The method comprises receiving source data from at least one content server, the source data being associated with electronic content, and generating local data based on at least one of an analysis of the received source data or an extraction from the received source data. The method further comprises classifying the electronic content as being associated with one or more content stacks, generating representations of the electronic content based on the local data, and generating instructions to display at least one content stack on a user interface, each displayed contact stack being operable to display one or more of the representations of the electronic content associated with the content stack based on the classification.

In accordance with additional embodiments of the present disclosure, a system is disclosed for providing content stacks for electronic content. The system comprises at least one processor and a storage device that stores a set of instructions that, when executed by the at least one processor, causes the at least one processor to receive source data from at least one content server, the source data being associated with electronic content, and generate local data based on at least one of an analysis of the received source data or an extraction from the received source data. The set of instructions further cause the at least one processor to classify the electronic content as being associated with one or more content stacks, generate representations of the electronic content based on the local data, and generate instructions to display at least one content stack on a user interface, each displayed contact stack being operable to display one or more of the representations of the electronic content associated with the content stack based on the classification.

In accordance with still further embodiments of the present disclosure, a non-transitory computer-readable medium is provided for storing a set of instructions that, when executed by at least one processor, cause the at least one processor to receive source data from at least one content server, the source data being associated with electronic content, and generate local data based on at least one of an analysis of the received source data or an extraction from the received source data. The set of instructions further cause the at least one processor to classify the electronic content as being associated with one or more content stacks, generate representations of the electronic content based on the local data, and generate instructions to display at least one content stack on a user interface, each displayed contact stack being operable to display one or more of the representations of the electronic content associated with the content stack based on the classification.

BRIEF DESCRIPTION OF THE DRAWINGS

The accompanying drawings, which are incorporated in and constitute a part of this specification, illustrate several embodiments of the present disclosure and, together with the description, serve to explain the principles and features of the present disclosure.

FIGS. 5A-5E illustrate exemplary dialogs that are created in connection with generating a new content stack or modifying an existing content stack, consistent with embodiments of the present disclosure.

DETAILED DESCRIPTION OF EXEMPLARY EMBODIMENTS

Figure 1:
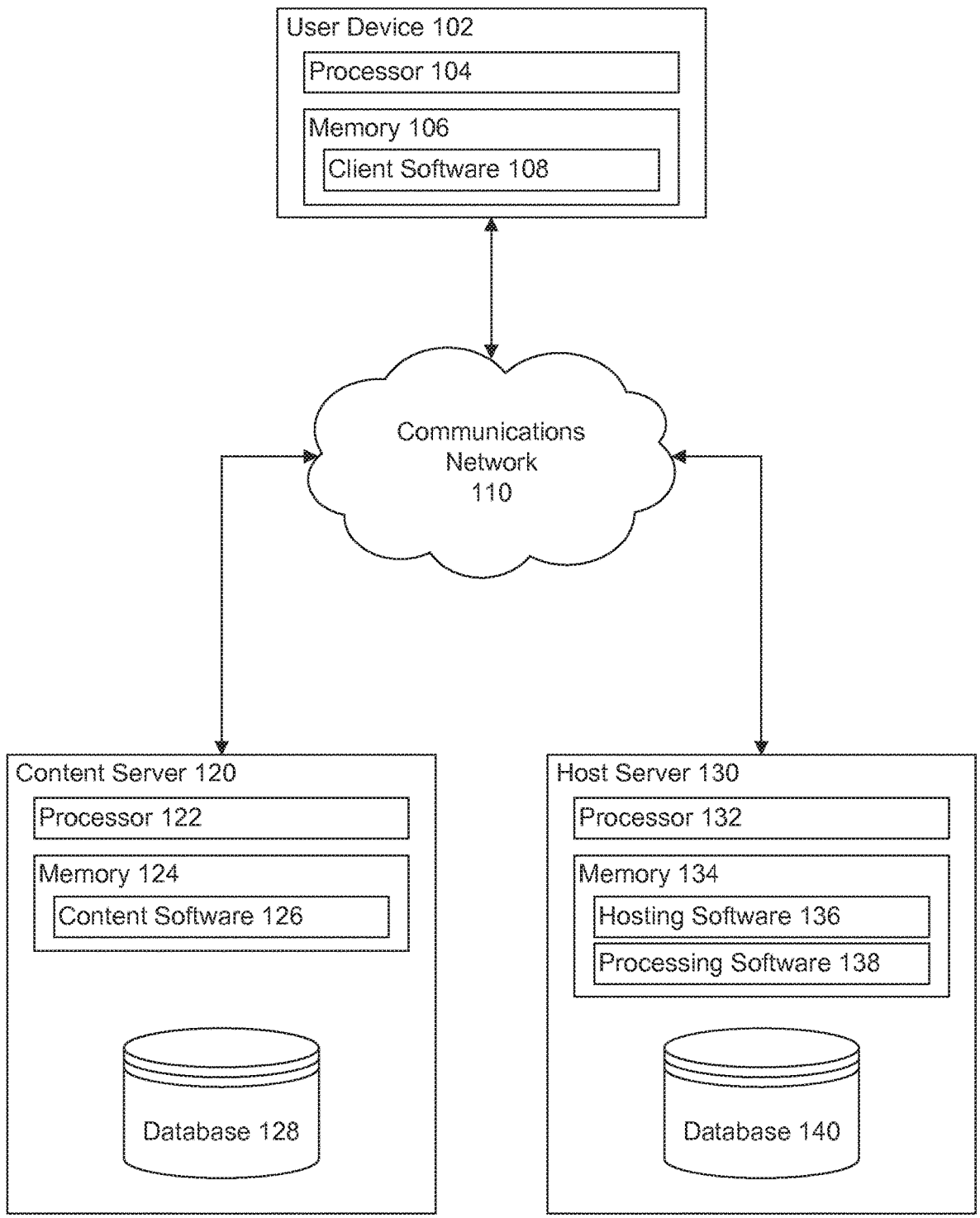
FIG. 1 is a diagram of an exemplary computing environment within which embodiments of the present disclosure may be practiced.

Reference will now be made in detail to embodiments of the present disclosure, examples of which are illustrated in the accompanying drawings. The discussion will use the same reference numbers included in the drawings to refer to the same or like parts.

In this disclosure, the use of the singular includes the plural, unless specifically stated otherwise. Also, in this disclosure, the use of "or" means "and/or," unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Embodiments of the present disclosure provide improved systems and methods for processing and organizing electronic content. Consistent with embodiments of the present disclosure, the electronic content may be organized into one or more content stacks. As used herein, the term "electronic content" refers to any form of e-mail, electronic message, instant message, social media messages, text messages (e.g., SMS messages), blog posts, alerts, news, notes, documents, web pages, content feeds, tweets, and the like. The term "content stack" refers to a collection of electronic content that may be visually represented or graphically displayed on a user interface of an electronic device (such as a computer, table, mobile phone, or smartphone). The term "tile" refers to a display item on a user interface. A "tile" may be square or of any other suitable shape. Exemplary embodiments of content stacks are presented in this disclosure.

In accordance with embodiments of the present disclosure, content stacks may be created for visually or graphically displaying representations of electronic content based on classification of the electronic content. The classifications may be based on predefined content stack rules or may be based on content stack rules provided by a user, shared between users, and/or created by a user. For example, a user may create a content stack for all electronic content received from a particular source or group of sources.

In accordance with some embodiments, a user may create a content stack for all e-mail or electronic messages from a particular sender or group of senders. In such embodiments, one or more representations of all electronic messages from that sender or group of senders may be displayed in the content stack to the user. For example, a representative image of the content stack may be placed on the user interface. Upon selection of any representation of a content stack, the corresponding messages in that content stack may be opened. For example, the user may click on the representative image to access the messages in the corresponding content stack. Moreover, in some embodiments, electronic content and their representations may not be displayed in a traditional inbox, and are only associated with and displayed within a content stack to a user.

FIG. 1 illustrates an exemplary computing environment 100 within which embodiments of the present disclosure may be practiced. In FIG. 1, a user device 102, content server 120, and host server 130 are interconnected via a communications network 110. Communications network 110 may represent any form or medium of digital data communication. Examples of communication network 110 include a local area network (LAN), a wireless LAN, e.g., a "WiFi" network, a wireless Metropolitan Area Network (MAN) that connects multiple wireless LANs, a wide area network (WAN), e.g., the Internet, and a dial-up connection (e.g., using a V.90 protocol or a V.92 protocol). Further, the Internet may include any publicly accessible network or networks interconnected via one or more communication protocols, including, but not limited to, hypertext transfer protocol (HTTP) and transmission control protocol/internet protocol (TCP/IP). Moreover, communications network 110 may also include one or more mobile device networks, such as a GSM network or a PCS network, that allow devices, such as user device 102, to send and receive data via applicable communication protocols, including those described above.

User device 102, content server 120, and host server 130 may represent any type of computing system capable of performing communication protocol processing. An example of a computing system is described herein with reference to FIG. 1. Additional examples of computing systems are described below with reference to FIG. 7.

User devices, such as user device 102, may include a processor 104 and a memory 106. Processor 104 and memory 106 may be any type of CPU/GPU or memory discussed above. Memory 106 may store client software 108 for execution by processor 104. Client software 108 may include a browser, e-mail client, messaging client, application, or any other instructions for presenting content to a user. For example, client software 108 may include a set of instructions used to provide user interfaces displayed by user device 102.

In accordance with the embodiments of the present disclosure, user device 102 may include, but is not limited to, a tablet, a personal computer, a laptop computer, a notebook computer, a handheld computer, a personal digital assistant, a portable navigation device, a mobile phone, a smartphone, or any other computing device or system that is operable to transmit and receive data across communications network 110.

Content servers, such as content server 120, may include a processor 122 and a memory 124. Processor 122 and memory 124 may be any type of CPU/GPU or memory discussed above. Memory 124 may store content software 126 for execution by processor 122. Content software 126 may include e-mail software, instant messaging software, document management software, web-hosting software, or any other set of instructions that manages electronic content. Content server 120 may also include or be connected to a database 128 that stores electronic content managed by content software 126. Electronic content stored in content server 120 may be represented by source data stored in content server 120.

Host servers, such as host server 130, may include a processor 132 and a memory 134. Processor 132 and memory 134 may be any type of CPU/GPU or memory discussed above. Memory 134 may store hosting software 136 and/or processing software 138 for execution by processor 132. Host server 130 may be implemented using one or more technologies, such as JAVA shop, Apache/Tomcat, Bus Architecture (RabbitMQ), MongoDB, SOLR, GridFS, Jepetto, and the like. Hosting software 136 may include e-mail software, instant messaging software, document management software, web-hosting software, and/or any other program or software or set of instructions that provides electronic content to a user. For example, hosting software 136 may include a set of instructions to generate user interfaces that are to be displayed to a user by user device 102. In some embodiments, hosting software 136 may generate a plurality of tiles to be displayed on the user interfaces. A tile can be a content stack tile or a plugin tile. Hosting software 136 may also select or generate representations of the content stacks and display them as the cover images of the corresponding tiles. The tiles may be generated by default or by user. Hosting software 136 may also associate attributes to the tiles generated, which define the permitted user interactions. In some embodiments, hosting software 136 may also generate dialog interfaces that are displayed to the user when a predefined action occurs. The dialogs may be graphically presented on a user interface or display of a user device. For example, a dialog window may pop up to request confirmation when the user selects to delete a content stack. Host server 130 may also include or be connected to a database 140 that stores at least a portion of the content provided by content server 120 or generated by hosting software 136.

Processing software 138 may include software that processes electronic content for presentation to a user. For example, processing software 138 may be, or be part of, a rich backend architecture that sits in front of one or more remote systems or sources of electronic content, such as e-mail or messaging systems, news or blog sites, and social networking platforms or services. In one embodiment, processing software 138 is a private processing system or application that is hosted or located separately from e-mail systems, such as aol.com, gmail.com, or yahoo.com. In an additional embodiment, processing software 138 is a private processing system or application that is hosted, integrated, and/or co-located with a public e-mail or messaging system, such as aol.com, google.com, or yahoo.com.

Processing software 138 may leverage remote systems to extract electronic content and post messages using standard interfaces and protocols, such as IMAP, SMTP, or OAuth. In one embodiment, host server 130 does not own or control the user's content. Rather, the electronic content may exist at its rightful source of record, such as content server 120. However, processing software 138 may cache a limited subset of information extracted from content of the electronic messages (e.g., photos, attachments), metadata associated with electronic content, and message item skeletons. Processing software 138 may also reference the source of record when necessary to retrieve the original content. Hosting software 136 may store metadata and other generated local data in database 140 for functional use. Local data is generated from the received content in such a way that information about the received content is provided in a simple visual manner. Aspects related to generating local data are discussed in further detail below.

Processing software 138 may continuously synchronize with the source of record, such as content server 120, to maintain an up-to-date imprint of the account. For example, processing software 138 may synchronize with content server 120 at a predetermined frequency, such as every five minutes, every half hour, or every hour.

Figure 2:
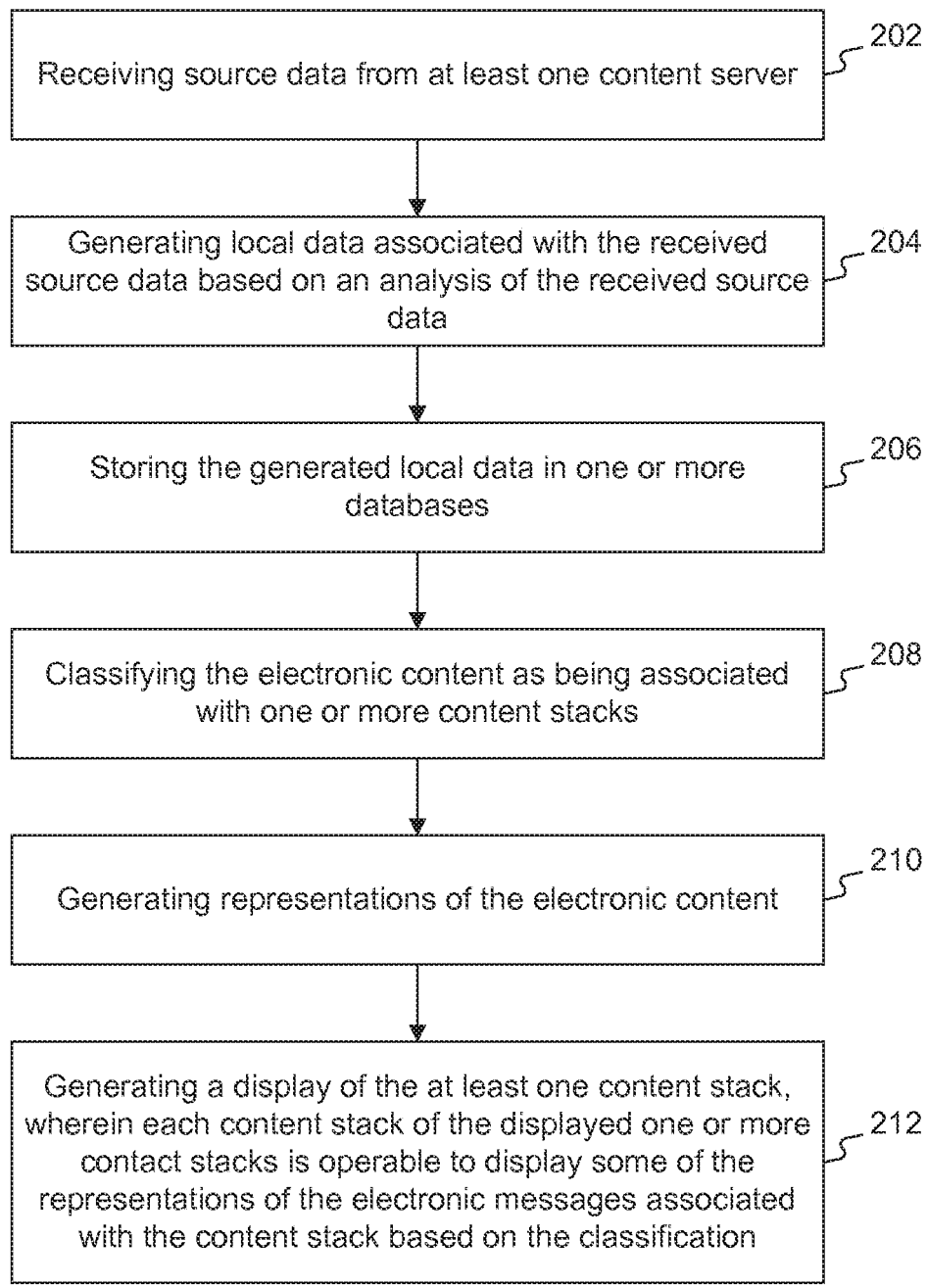
FIG. 2 is a flow chart of an exemplary method for organizing and displaying data associated with electronic content in at least one content stack, consistent with embodiments of the present disclosure.

FIG. 2 depicts a flow chart of an exemplary method 200 for organizing and displaying data associated with electronic content in at least one content stack, consistent with embodiments of the present disclosure.

In step 202, host server 130 receives electronic content (represented by source data) from at least one content server 120. Content server 120 may be implemented as any traditional source of data that provides electronic content, such as IMAP/SMTP, Facebook™, LinkedIN™, Twitter™, etc. In some exemplary embodiments, the received electronic content may be e-mail or electronic messages. In other exemplary embodiments, the received source data for the electronic content may include data such as contact lists, RSS feeds, or instant messages from instant messaging applications, etc.

This source data may be received in response to a request from host server 130 to content server 120. Therefore, receiving the source data may entail mining data from accounts residing at content server 120, the source of record. In exemplary embodiments, the mining of an account for use may happen in a way that results are immediately visible and propagated through the feature layers as soon as possible. This way, a user is able to read, organize, and compose messages or other electronic content on an immediate basis utilizing processing software 138. Full mining of all content from a source of record (e.g., an e-mail account), however, could take from an hour or two hours to a few days, depending on the size of the record or associated account. Launching processing software 138 in host server 130 for the first time may trigger an initial mining of a record or account. For example, an e-mail account for which the content resides in content server 120 would be mined by host server 130 in response to an activation of processing software 138. Another trigger for mining of an account at a source of record may be the linking of a new account from a source of record to host server 130 by processing software 138.

In other embodiments, processing software 138 forwards authentication information to content server 120 to access data at the source of record. Based on the authentication, a link is created between an account based in content server 120 and processing software 138.

In other embodiments, in response to any updates to source data in content server 120, the updated source data is sent by content server 120 to host server 130. Thereby, content server 120 is constantly or frequently receiving updated content.

In step 204, local data is generated that is associated with the received source data. The local data may be generated by processing software 138 based on an analysis of the received source data. For example, the generated local data may include message skeletons representing contents of respective electronic messages, metadata associated with respective electronic messages, and/or extracted attachments or images.

With respect to metadata, the subject of an electronic message, information related to the time that the electronic message was sent or received, and/or addresses related to the electronic message may be included. The addresses related to the electronic messages may include addresses of a sender, recipient(s), and/or any addresses that are carbon copied (CC) or blind carbon copied (BCC).

A message snippet may be text that is indicative of the contents of the text included in an electronic message. Alternatively, a message snippet may be text describing the message content.

Images may be attached or embedded within an electronic message. The term "attachments" as used in the present disclosure refers to additional types of file attachments apart from attachments related to image files, such as JPEG, TIFF, PNG formats, etc. These additional types of file attachment formats may include Word, PDF, or PPT files. The attachments may also include media files, such as mp3, mp4, or additional audio/video formats.

As part of step 204, generating the local data may further include generating thumbnails of images, thumbnails of first pages of attachments when the file format is known, GPS to physical address conversion, snippet creation from message bodies, metadata, etc. Various sizes of thumbnails may be generated for each image. For example, as discussed later, different types of representations of an electronic message may require a different size thumbnail. In some embodiments, up to four different sizes of impressions (including thumbnails) may be generated for each image. Additionally, the known file types for which thumbnails of first pages are generated include PDF, DOC, XLS, PPT, HTML, TXT files, etc.

In addition to generating thumbnails for attachments, icons may also be generated for each electronic message containing an attachment. The icons may indicate basic information about the characteristics of a message's attachments, such as names, formats, or sizes of the attached files. Icons may specifically be used for unknown types of files or when the format of the file does not lend itself to a visual representation.

Additionally, as part of step 204, a conversation history may be generated for all electronic messages received. Accordingly, a linkage may be created between the currently received electronic message and previous message(s). This information may be stored as part of the generated local data. Accordingly, related messages (or their representations) may be rendered illustrating a conversation history. In some embodiments, certain sources of record may generate and store a conversation history. In such cases, conversation histories do not have to be generated by the system and are simply stored locally.

In step 206, the generated local data is stored in one or more databases. For example, the generated local data may be stored in database 140 of host server 130.

In additional embodiments, the generated local data may be indexed. The generated local data and the index may then be stored in database 140 by processing software 138. In exemplary embodiments, database 140 may be a SOLR search database that allows for optimal search performance when a search is conducted. For example, a simple search may be conducted for messages from a particular sender utilizing stored metadata of each of the electronic messages.

In accordance with certain embodiments, processing software 138 may be utilized to store the generated local data in database 140.

In step 208, the electronic messages and/or other content are classified as being associated with one or more content stacks. This classification may be based on content stack rules associated with each of the one or more content stacks. Each of the content stack rules may entail a predefined classification associated with a type of electronic content or a trained database model. For example, the predefined classifications may include electronic messages or other content associated with at least one of daily deals, top stories, retailers, social notifications, attachments, and images. Similarly, if a new content stack is created or an old content stack is edited, the electronic content would be reclassified corresponding to the new content stack rules that would be generated. For example, if a new stack is generated for all messages from a particular sender or set of senders, then an updated classification would occur based on the new contact stack rule for all the electronic messages.

The classification of the electronic messages may be based on the local generated data. For example, the classification may be based on metadata that indicates basic information regarding the electronic messages. For example, a whitelisting may be utilized, such as e-mails from certain senders that are classified as being associated with a particular content stack.

The classification may also be based on a trained business model classification. For a trained business model classification, the local generated data may be utilized in learning algorithms (e.g., mathematical equations or processes) to optimize predictions and results in a trained business model with respect to classification based on certain features. For example, if, based on metadata, it appears that all e-mails from any ".net" website are being added to a certain content stack, the trained business model will be optimized so that any new messages that are received will be predicted to belong to that content stack.

In another embodiment, a support vector machine (SVM) or a Gaussian kernel may be utilized as learning algorithms, while Lagrange multipliers may be used for optimization of the predictions of classification.

In accordance with certain embodiments, metadata related to each classified electronic message or other content may be stored along with the electronic message or other content in database 140.

The content stack rules may look at what content servers to feed from, classification, keywords, sender addresses, recipient addresses, etc., to determine what source data belongs to a specific stack. For example, a photo stack may include images included within the received data from content server 120. Additionally, the content stack rules may be a combination of AND/OR and IF/THEN rules or combinations. An AND/OR operation may entail a combination of characteristics of senders, recipients, keywords, terms that are not allowed, etc. For example, classification of the content stack may entail a MongoDB Query utilizing metadata.

An exemplary AND/OR operation may comprise: E-mail from a <sender1> OR <sender2> AND with <keyword> in <subject/body>.

An exemplary IF/THEN operation may comprise: (1) IF an e-mail from <sender> with subject containing <term(s)> THEN place into <stack> and send me an SMS alert; and/or (2) IF an e-mail from <sender> with <attachment type> and subject containing <term> THEN place into <stack> and add to my calendar.

As explained in further detail below, when a new content stack is generated, new corresponding content stack rules are automatically generated for that content stack. Similarly, if an existing content stack is modified, the corresponding content stack rules would automatically be modified for that content stack.

Processing software 138 may carry out the classification based on the content stack rules and commit the classification to database 140. Processing software 138 may also create and modify content stacks and the corresponding content stack rules.

Referring again to FIG. 2, in step 210, representations of the electronic messages or other content are generated. The representations may be based on the local data. For example, if an electronic message is not classified as being associated with any of the content stacks, then it would simply appear in an inbox and the representations may be based on metadata and/or a message snippet, indicating a sender, subject, and/or time of receipt. If a thumbnail is generated for the electronic message as local data, it may also be included in the representation.

In some embodiments, representations may be dependent on the classification. For example, for an e-mail that includes an image or an attachment, a representation of a message may be a thumbnail generated for the image or the attachment. A representation of a message may also be, or may include, word clouds based on the text of the electronic message. Word clouds provide a quick visual indication of the contents of the electronic message. Other alternative representations will be apparent based on the description of the content of the content stacks provided further below.

In accordance with certain embodiments, multiple representations may be generated for each of the electronic messages or other electronic content. For example, an electronic message may have a first representation for display in an inbox, a second representation for display in a tile representing a content stack, and/or a third representation for display in an opened content stack. All representations may provide basic visual information about contents of the electronic message.

In step 212, a display of the at least one content stack is generated. For example, the at least one content stack may be displayed on a graphic user interface. Each displayed content stack may be operable to display some of the representations of the electronic messages and/or other electronic content associated with the content stack based on the classification. Each content stack may be displayed as a tile or set of tiles. Responsive to movement of a cursor representing a user input over a respective tile, various representations from the representations of the electronic content associated with the tile's corresponding content stack may be displayed. The tile displays one representation associated with a content stack at a time. A certain amount of movement of the cursor over the tile corresponds to display of different representations associated with the content stack. In some embodiments, based on movement of a cursor over a particular tile, up to a predetermined number (e.g., 3, 5, 6, 10, 12, etc.) of associated representations may be displayed.

The following is a list of exemplary content stack types, but it is not meant to be inclusive of all types of content stacks that may exist:

Photo Stack: Parses out all images from within a user's content account and presents them in a visual manner. The photo stack may also allow for a full gallery experience, quick sharing of images and photos (via e-mail or social networking), and the ability to see the content from which the images were parsed.

Attachment Stack: Parses out all the attachments from within a user's content account and presents them in a visual manner. The attachment stack may show thumbnails of the actual attachment (PDF, office documents, presentations, etc.) versus a text list of file names. With one click, users may download the attachment, view the supporting file types online, and quickly find the content the attachment was from. Users may also have the ability to quickly share the attachment via e-mail or social networks.

Daily Deals Stack: Identifies the "daily deal" content and presents it in a "reader" fashion, allowing users to quickly swipe through all of their deals in one spot. Users may customize the daily deals stack to add and remove senders they deem are daily deals (dragging and dropping into a stack, as explained further below with respect to FIG. 3).

Retailer E-mail Stack: Identifies the "retailer" content and presents it in a "reader" fashion, allowing users to quickly swipe through all of their retail e-mails in one spot—similar to a Sunday advertisement circular. Users may customize the retail e-mail stack to add and remove senders that they deem are retailers (e.g., by dragging and dropping content into the stack, as explained further below with respect to FIG. 3).

Social Notification Stack: Identifies the "social network notification" content and presents it in a "reader" fashion, allowing users to quickly swipe through all of their updates/notifications in one spot.

Group Stack: Identifies messages that are part of a mailing list or group. The group stack may allow for customization based on sender, recipients, and subject tokens.

Sender Stack: Shows all the messages, attachments, photos, and metadata related to a single sender.

Starred Stack: Shows all the messages that have been starred in the source of record, i.e., within content server 120 or at the host server 130.

In some embodiments, the content stacks may include system stacks and user-created stacks. The system stacks are predefined stacks that are presented by default and cannot be deleted by the user. However, they can be removed from the graphic user interface and sent to the stack library. Examples of system stacks may include photo stacks, attachment stacks, daily deals stacks, retailer e-mail stacks, starred stacks, etc. The user-created stacks are created by the user, and can be edited and deleted by the user. Examples of user-created stacks may include sender stacks. For example, the user may group all e-mails from a single sender to a sender stack.

In further embodiments, if host server 130 receives information indicating selection of a content stack, the content stack is opened to display the contents of the content stack. Therefore, representations of all electronic content associated with the content stack are displayed.

In some embodiments, the information and data received from sources-of-record may be deleted along with the corresponding local generated data, classifications, representations, etc. However, the authentication information is not deleted, allowing for steps of the method of operation 200 to be reinitiated. Accordingly, any sources of record will be re-mined.

Figure 3:
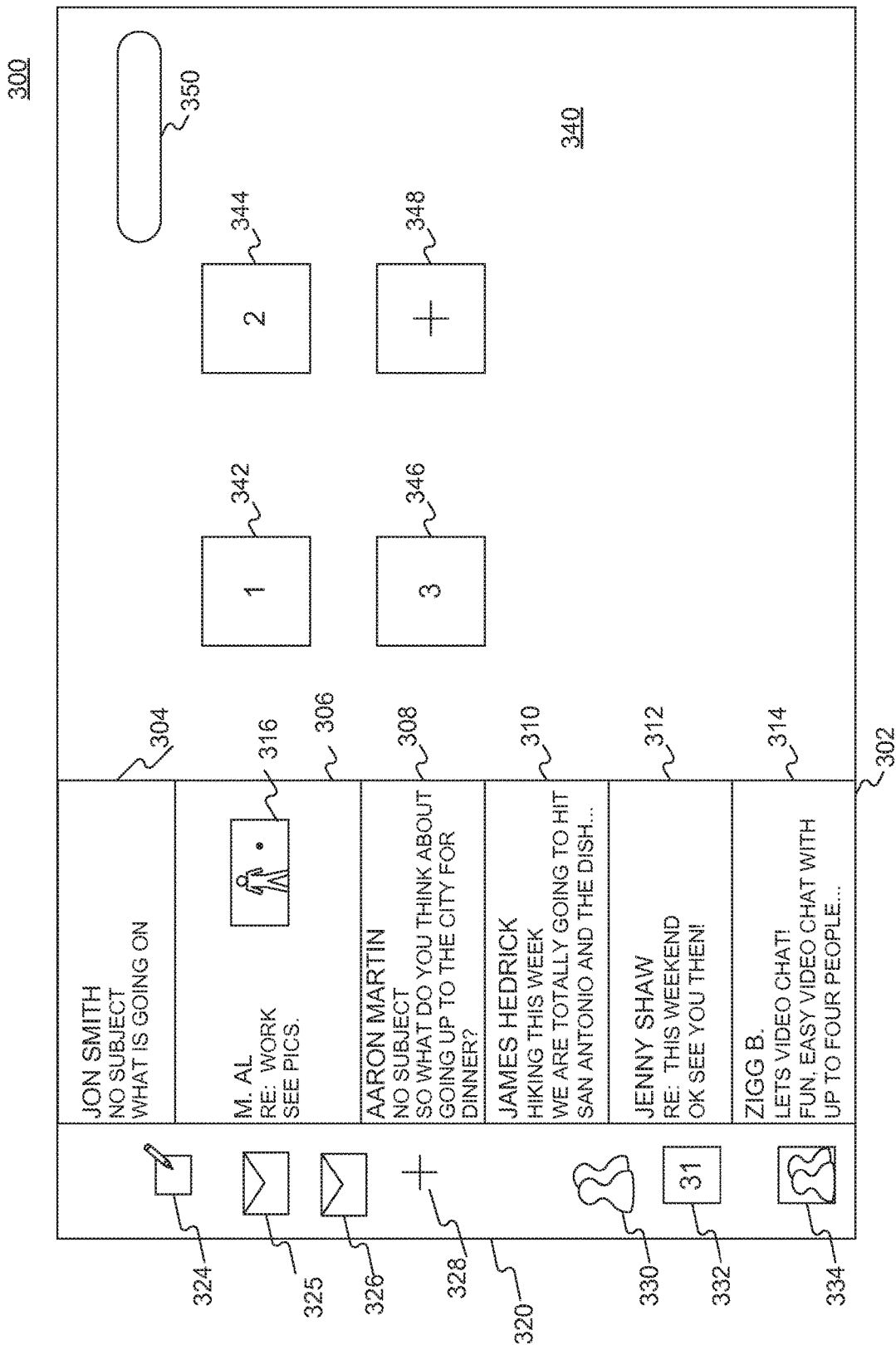
FIG. 3 illustrates an exemplary user interface with content stacks for electronic content, consistent with embodiments of the present disclosure.

FIG. 3 illustrates an exemplary user interface with content stacks, consistent with embodiments of the present disclosure. Display 300 may be rendered on a display screen (not illustrated) of user device 102. For example, display 300 may be a graphical user interface or GUI that allows user interactions. As will be appreciated by persons of ordinary skill in the art, all of the elements illustrated in FIG. 3 are not necessary, but are merely included for exemplary purposes. The exemplary embodiment of FIG. 3 is shown with representations of electronic messages. Of course, embodiments of the present disclosure are not limited to electronic messages, and other forms of electronic content may be utilized, including in implementations consistent with FIG. 3.

Inbox 302 is displayed, which includes representations 304, 306, 308, 310, 312, and 314 of respective electronic messages. A selection of any of the representations 304, 306, 308, 310, 312, and 314 leads to opening of a corresponding message. Each representation 304, 306, 308, 310, 312, and 314 may visually indicate unique information about a corresponding message. For example, representation 304 simply indicates the name of the sender, the subject of the electronic message, and a snippet of the message. In comparison, representation 306 is unique in that it contains a generated thumbnail 316 in addition to the name of the sender, the subject of the electronic message, and a snippet of the message. The generated thumbnail 316 may be a thumbnail of an image or attachment generated as local data. Accordingly, a representation of an electronic message allows a user to quickly visually preview contents of the electronic message.

Inbox 302 also includes a menu bar 320. The menu bar 320 may contain various icons, including new mail icon 324, aggregated mailbox icon 325, first mailbox icon 326, add account icon 328, contacts icon 330, calendar icon 332, and home icon 334.

Selection of new mail icon 324 allows a user to draft a new electronic message that may be sent utilizing a messaging service provided by an account residing at any source of record that is associated with host server 130. For example, the newly drafted message may be sent utilizing any account residing at content server 120 that is linked to processing software 138 in host server 130.

Aggregated mailbox icon 325 may display representation for messages from all the accounts linked to host server 130 in inbox 302. Accordingly, all the messages from separate accounts are aggregated. An example of such an account may be represented by first mailbox icon 326. Selection of first mailbox icon 326 leads to display of representations of electronic messages linked to a first e-mail account that may reside at any source of record, such as at content server 120.

Add account icon 328 allows users to link additional accounts, such as e-mail accounts, so that their data may be mined, as discussed above. These additional accounts may reside at any source of record, such as content server 120. If a new account is added, a new corresponding mailbox icon for the new account would be added to menu bar 320. Additionally, any new content from the new account would be processed utilizing method 200 (see FIG. 2) so that the new electronic content may be presented in content stacks.

Selection of contacts icon 330 leads to the display of contacts. These contacts may be imported from any of the accounts at the sources of record. Additionally, in some embodiments, the contact lists from various accounts at the sources of record may be aggregated for providing contacts in response to selection of contacts icon 330.

Selection of calendar icon 332 may lead to display of a calendar. The calendar may be an aggregation of calendars present in all associated accounts at the sources of record.

In another embodiment, the calendar may hold entries that are only stored in the host server 130 and then provided at the user device 102, but not provided to the sources of record, such as content server 120.

In other embodiments, selection of calendar icon 332 may lead to display of a calendar at a source of record, such as content server 120.

Selection of home icon 334 may allow for access to various functions, including signing out of an account at the host server 130, editing settings for processing software 138, etc.

Inbox 302 also contains a content stack window 340, where all content stacks may be displayed. Content stack window 340 includes user interface elements 342, 344, 346, and 348. User interface elements 342, 344, and 346 are pre-existing content stacks, while user interface element 348 represents a user interface operable to prompt creation of a new stack, as explained in further detail with respect to FIG. 4. User interface elements 342, 344, 346, and 348 may display various content, such as message subject and snippet, news headlines, and deals. Search box 350 may be utilized to search contents of an inbox or any of the content stacks.

Content stacks may be represented using one or more tiles. As discussed above, a content stack tile may display a preview of representations of messages or other electronic content associated with the content stack. As a cursor is moved across the tile of a content stack, various different representations are illustrated. The representations to be displayed initially may be determined temporally or based on some ranking means. For example, representations of the latest received electronic messages or representations for messages containing "deals" that are about to expire may be ranked higher, and thus appear first.

As discussed previously, these representations may be generated based on local data and may entail pictorial, graphical, and/or textual representations of the electronic messages or other electronic content.

The stack tiles on display 300 can be repositioned by the user via drag and drop mouse interaction. For example, the tiles may be placed according to cursor coordinates. Upon the repositioning of one tile, the positions of the remaining tiles may be automatically adjusted to accommodate the repositioned tile. For example, if a tile is dragged between two adjacent tiles, one of the two adjacent tiles may be shifted to the next tile position to make space for the dragged tile.

In some embodiments, certain stacks may be permanently fixed to a position on the tile grid ("pinned"). Pinned stacks may not be affected by the auto arrangement of the stacks. In some embodiments, the pinned stacks can be manually repositioned by accessing the edit mode of the stacks. Once a pinned stack is repositioned, it may be pinned to the new position again. The pinned stacks may be displayed with a pin mark on top of the tiles.

When a new representation is associated with a content stack, a notification may be provided. For example, if user interface element 346 is a photo stack, and a new e-mail is received that contains an image, then a notification may be provided, such as a display of "new" on the tile indicating that the content stack has a newly associated representation.

In additional embodiments, the content stacks may be ordered to display based on which stacks have the newest associated representations. Continuing the example from above, if the photo stack represented by user interface element 346 is the content stack with the latest associated representation, then user interface element 346 may be moved to be the first tile presented in content stack window 340.

In exemplary embodiments, content determined to be part of a stack may be automatically placed in a content stack without entering inbox 302. This skipping of inbox 302 allows users to "clean up their inbox." This enables the content to "bypass" inbox 302 and be visible only within the pertinent stack. For example, if a user chooses to turn on "skip the inbox" for their daily deals stack, the received content type will not clutter inbox 302 and will be visible only in the daily deals stack. The skipping of inbox 302 may be toggled on and off at any time-content is simply hidden or shown within inbox 302 based on the "skip" setting. The skipping of inbox 302 may be a stack-specific setting, meaning that it can be adjusted from stack to stack, versus a global setting, where it is applicable to all of the content stacks.

Selection of a content stack, such as user interfaces 342, 344, and 346, may open the content stack. Contents of a content stack may be presented in various ways. For example, in a list view, representations of electronic messages or other content associated with the content stack may be presented to the user in a list similar to inbox 302. The list view may also provide statistics on the content in the stack, such as the number of representations of electronic messages or other content from each source.

In a tile view of a content stack, representations of electronic messages or other content associated with the content stack may be a series of tiles that preview the content. For example, the tiles may display representations based on the generated local data discussed above. In some embodiments, the content of the stack can be previewed by placing the cursor over the stack tile and clicking or selecting it.

Certain stacks may also allow a user to view content that is extracted from the electronic messages or other content in a gallery view. For example, photo stacks allow users to see extracted images and attachment stacks allow users to see extracted attachments that were extracted from electronic messages or other content when generating local data. This allows a user to view pertinent information directly without having to go through the message or electronic content to which it was attached. When viewing representations of electronic messages or other content within the photo or attachment stack, a user may be able to navigate back to an electronic message or other content that included the photo or attachment.

Processing software 138 may be preprogrammed with a number of stacks (i.e., the system stacks), such as retailers, deals, social notifications, news, attachments, photos, starred, etc. These stacks may be rendered in whole or in part based on the local data. For example, photo and attachment stacks may be rendered from stored local data that separates the photos and the attachments from the messages or other electronic content in which they were included.

The user may delete a user-created stack from display 300, e.g., by right clicking the stack and selecting "delete." A dialog window may be generated and displayed on top of inbox 302, requesting the user to confirm that he/she wants to delete the stack. The dialog window may also provide the option to delete all messages in the stack. Once confirmed, the stack, and optionally the messages, may be deleted. The user is not allowed to delete a system stack, but alternatively, he/she may choose to hide the stack from display 300. A dialog may be generated and displayed on top of inbox 302, requesting the user to confirm that he/she wants to hide the stack.

In embodiments, generation of local data, classification, and association of electronic content conducted in host server 130 may not be visible at a source of record, such as content server 120. However, any actions related to electronic content or representations thereof may be reflected back in the source of record (content server 120), including marking electronic content as read/unread, deleted, or moved to a different folder. Accordingly, if a user opens a mail interface for an account from content server 120, there will be no indication of anything related to a content stack. However, if a message or other electronic content is deleted utilizing hosting software 136, the message or content would also be deleted in content server 120. For example, deleting a message from a Gmail account would appear deleted if the user went to Google™ gmail.com and viewed the account.

In certain embodiments, processing software 138 may cache received data. For example, processing software 138 may maintain a cache of received data for "X" number of days so that it does not have to go back to the source of record for content. In such embodiments, when an electronic message is requested based on a selection of the message's representation, if the message is cached, it is easily accessible. However, if an electronic message is not cached, then host server 130 is forced to open a connection to the source of record, i.e., content server 120, and fetch the electronic message.

Figure 4:
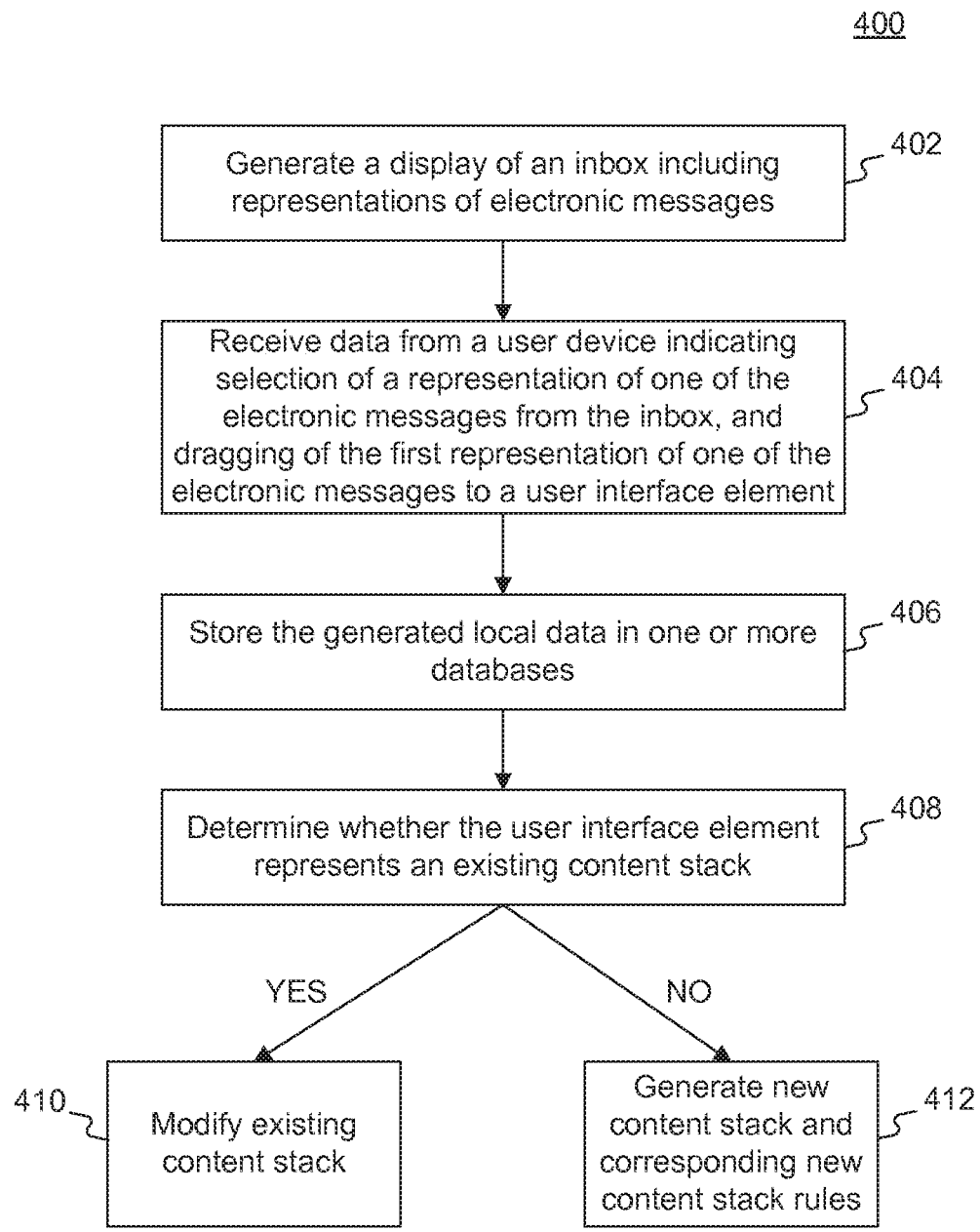
FIG. 4 is a flow chart of an exemplary method for generating a content stack or for modifying an existing content stack, consistent with embodiments of the present disclosure.

FIG. 4 is a flow chart of an exemplary method 400 for generating a content stack or for modifying an existing content stack, consistent with embodiments of the present disclosure.

In step 402, a display of an inbox is generated that includes representations of electronic messages or other electronic content. For example, FIG. 3 displays an inbox 302 that includes representations 304, 306, 308, 310, 312, and 314 of electronic messages.

In step 404, data is received from a user device indicating selection of a representation of one of the electronic messages or other content from inbox 302, and dragging of the first representation of one of the electronic messages or other content to a user interface element. For example, data is received from a user device 102, indicating that a user has selected one of the representations 304, 306, 308, 310, 312, and 314 of electronic messages and dragged it to a user interface element, such as user interface elements 342, 344, 346, and 348, which are all present within content stack window 340.

In step 406, the generated local data is stored in one or more databases. For example, generated local data is stored in database 128.

In step 408, it is determined whether the user interface element represents an existing content stack. For example, user interface elements 342, 344, and 346 are pre-existing content stacks, while user interface element 348 represents a user interface element operable to prompt creation of a new stack.

If it is determined that the user interface element represents an existing content stack, then in step 410, the existing content stack rule is modified. All of the content stacks have corresponding content stack rules. For example, each of user interface elements 342, 344, and 346 is a pre-existing content stack. Therefore, the dragging of representation 306 of an electronic message to user interface element 342 representing an existing content stack triggers a modification of the content stack and, therefore, the corresponding stack rule.

For the modification, logic may be derived from properties of representation 306 and/or the electronic message or other content it represents. For example, if the content stack represented by user interface element 342 is based on a content stack rule that all e-mails from a sender "John Doe" are included, then the dragging of representation 306 may lead to a suggestion to modify the rule to state: IF from <John Doe> OR <M.AL> THEN add to Stack 1 (user interface element 342), where M.AL is the sender of the electronic message for which representation 306 is provided.

A user interaction with display 300, such as dragging and dropping a representation of an electronic message onto a content stack, may be detected. For example, the cursor coordinates may be compared with the coordinates of the content stacks to determine which content stack the message is dragged to. The dragging of a representation to an existing content stack may trigger an operation to be conducted by processing software 138 for modification of content stack rules. The actual rules may be based on a suggestion by processing software 138 based on an analysis of previous features of the content stack, an analysis of features of an electronic message whose representation is dragged, metadata associated with the electronic message, or a manual entry by a user.

Referring again to FIG. 4, if it is determined that the user interface element does not represent an existing content stack, then in step 412, a new content stack is created with corresponding content stack rules. For example, it may be detected that the user interface element is dragged onto an empty content stack on the user interface. An empty content stack may be displayed on the user interface as a placeholder stack and represented by a similar square tile.

Based on the dragging of a representation of a message to a new content stack tile, a user may then be prompted to specify a set of rules, such as the features of the message corresponding to the dragged representation, that should be used to classify related messages to additional representations to the stack. For example, representation 306 is dragged to user interface element 348, triggering an operation to create a new content stack along with corresponding content stack rules.

Here, the dragging of a representation to the new content stack tile triggers an operation to be conducted by processing software 138 for creation of a new content stack and corresponding content stack rules, based on an analysis of features of the electronic message whose representation is dragged, metadata associated with an electronic message, or a manual entry by a user.

Various customized dialogs may be generated during the process of generating a new contact stack or modifying an existing content stack. In some embodiments, if the user drags one or more representations of electronic messages (e.g., 304, 306, 308, 310, 312, and 314) to an empty stack or an existing stack on display 300, local data related to the one or more messages may be analyzed to extract representative characteristics of the messages. For example, if a single message is dragged into a stack, its sender and/or recipient information may be extracted. If multiple messages are dragged into the stack, the data may be analyzed to determine whether the messages share a common sender and/or recipient. If not, information of a group of senders and/or recipients may be extracted. A group recipient, such as an e-mail alias, may also be detected. Additionally, keywords may be extracted from the messages.

Figure 5A:
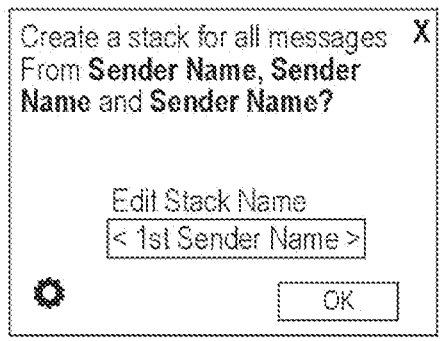
Figure 5B:
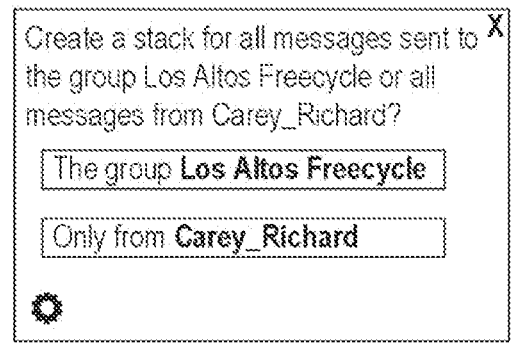
Figure 5C:
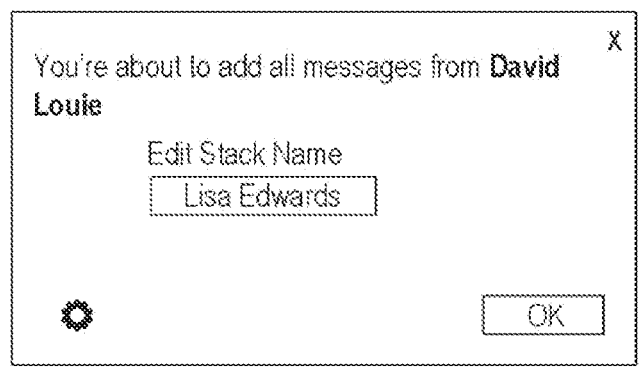

The customized dialogs or user interfaces may be generated, incorporating the extracted information. For example, a dialog may pose a question to a user such as "Create a stack for all messages from John Smith?" or "Create a stack for all messages from John Smith and Susan Smith?" The dialog may include option buttons for the user to select in response to the question, such as "Okay," "Cancel," and "Customize." Alternatively, the dialog may provide options between creating the stack for the group detected and creating the stack for a single sender/recipient, and the user is allowed to click on one of the options. Alternatively, if the messages are dragged to an existing stack, the dialog may show a message such as "You're about to add all messages from David Louie." The dialog may further include a text input box for the user to input/edit the stack name. In some embodiments, a default name may be displayed, such as "The Smith family," which can be edited by the user. FIGS. 5A-5C illustrate such exemplary user interfaces or dialogs.

Figure 5D:
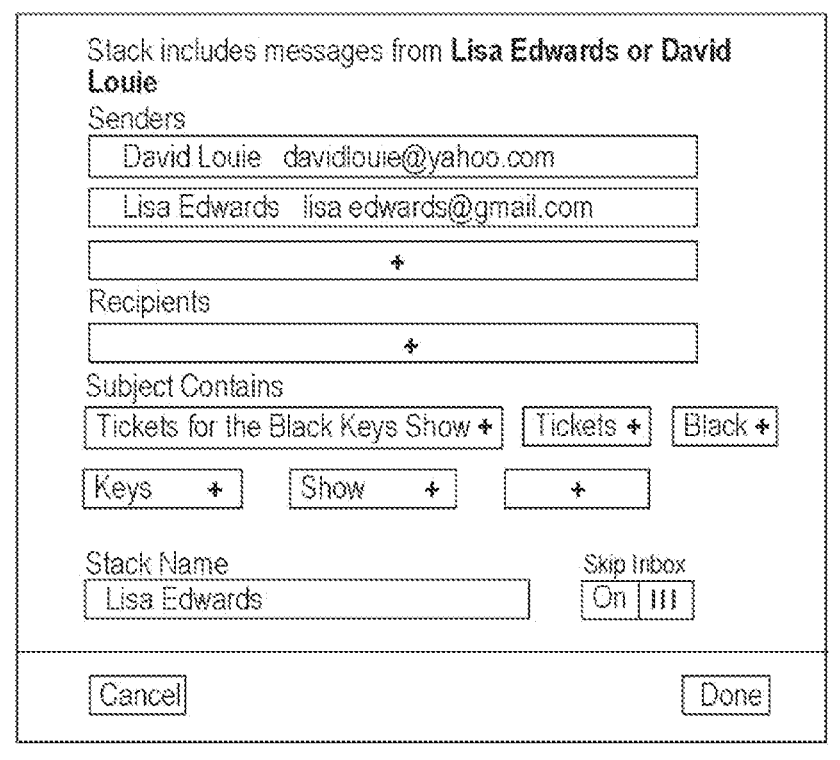

In some embodiments, if the user selects "Customize," another customized dialog may be generated to let the user further customize the stack. For example, FIG. 5D illustrates an exemplary dialog allowing the user to customize the stack. The dialog may automatically incorporate the extracted sender or recipient information. The user may also be allowed to add additional sender names and additional recipient names. The dialog may also provide keywords that are contained in the messages. In some embodiments, certain keywords may be detected from the messages and suggested to the user. The user may click on the suggested keywords to add them to the list. Messages may be filtered by the selected keywords.

Figure 5E:
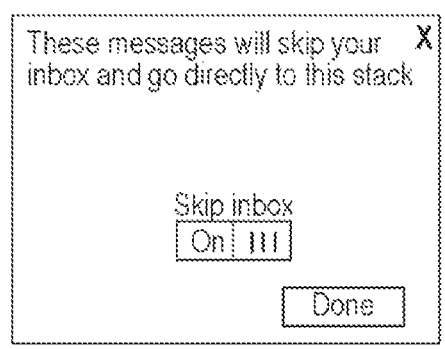

In some embodiments, a separate dialog may be generated to let the user choose whether the messages classified into the new stack should "skip inbox." For example, the dialog may include a "skip inbox" toggle. If the user selects ON, these messages are going to skip the inbox and go directly to the new stack. FIG. 5E illustrates an exemplary "skip inbox" dialog. Alternatively, the "skip inbox" toggle may be included in the dialog shown in FIG. 5D.

The dialogs of FIGS. 5A-5E may be moved around on top of display 300, maximized, or minimized.

Figure 6:
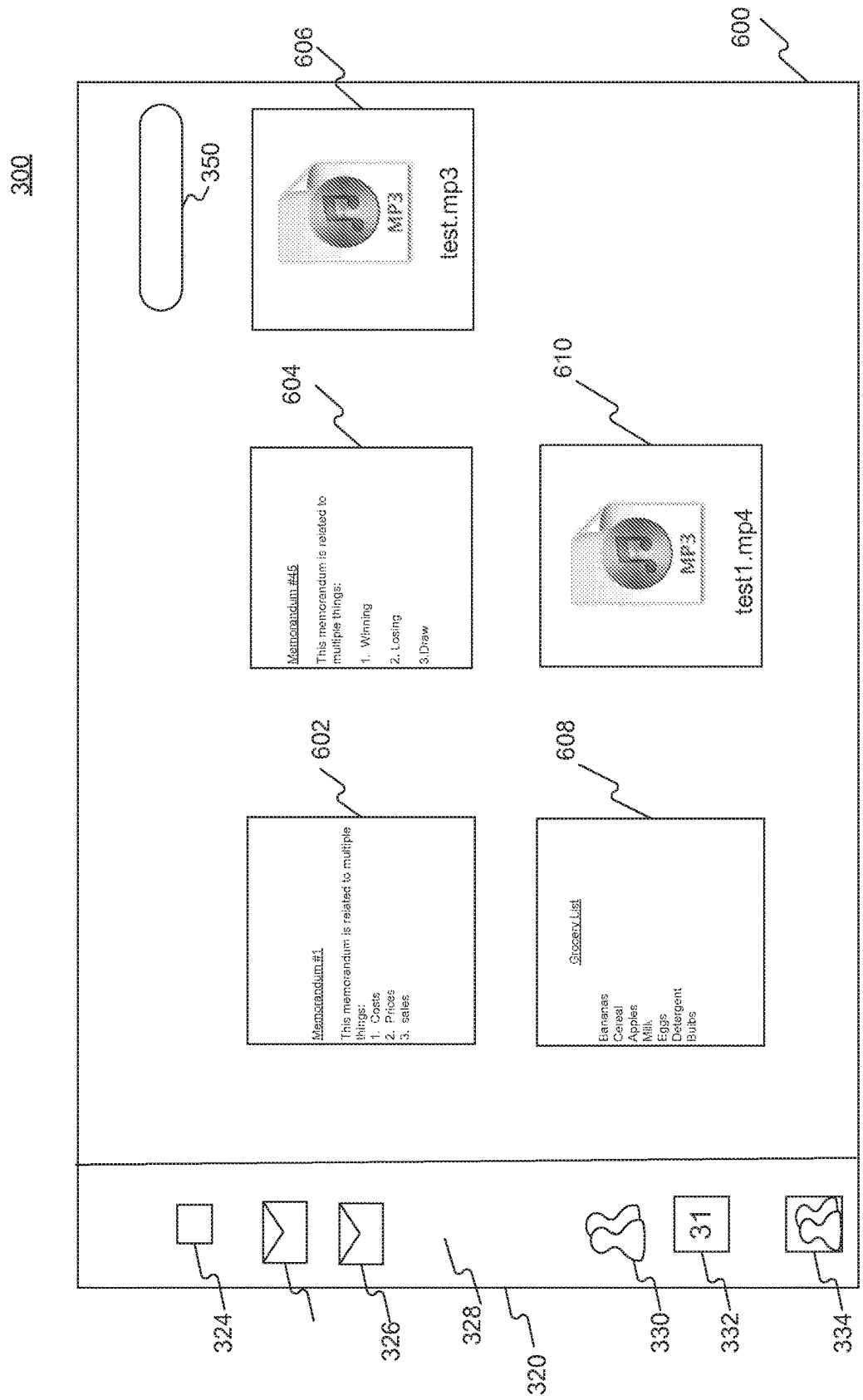
FIG. 6 illustrates an exemplary display of an attachment content stack, consistent with embodiments of the present disclosure.

FIG. 6 illustrates an exemplary display of an attachment content stack, consistent with embodiments of the present disclosure.

Attachment content stack 600 displays user interface elements 602, 604, 606, 608, and 610 representing attachments. Instead of one singular representation for each electronic message, thumbnails may be created for each attachment in an electronic message. Accordingly, if multiple attachments are included in an electronic message, multiple representations corresponding to each of the electronic messages may be created. For example, attachments corresponding to user interface elements 602, 604, and 606 may all be included as attachments in one message. Accordingly, all attachments may be quickly previewed in the attachment content stack 600. By selecting any of the user interface elements corresponding to an attachment, a user may have the ability to view details related to the corresponding attachment, download the corresponding attachment, open the corresponding attachment, or open the electronic message containing the corresponding attachment. For example, user interface elements 602, 604, and 608 may be thumbnails generated for each attachment, but user interface elements 606 and 610 may display icons indicating one or more of a format, name, size, type, etc of an attachment.

In further exemplary embodiments, thumbnails may be generated for each page of an attached file. Accordingly, within attachment content stack 600, responsive to movement of a cursor over a user interface element that is displaying a thumbnail, multiple pages may be previewed.

In other embodiments, the concepts of attachment content stack 600 may be applied to other types of content stacks, such as the photo stack. A selection of a displayed representation may lead to the display of menu options that allow a user to view, download, or share the extracted attachments or images. Alternatively, the user may be able to view, download, or share the electronic message from which the corresponding attachments or images were extracted. The menu options may include additional functions. These functions may be executed based on instructions stored in memory 134 of host server 130.

Figure 7:
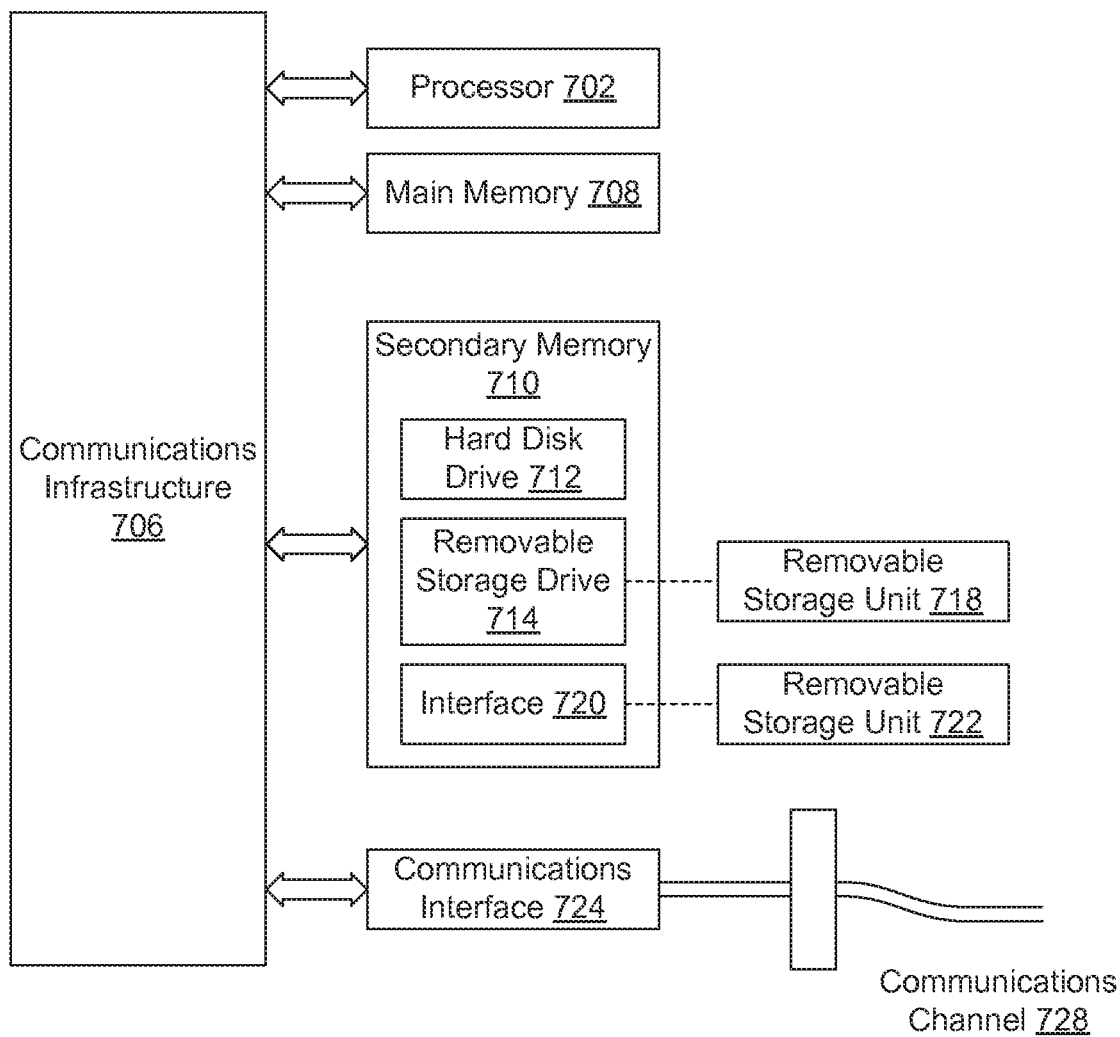
FIG. 7 illustrates an exemplary computer system, consistent with embodiments of the present disclosure.

FIG. 7 illustrates an exemplary computer system 700, consistent with embodiments of the present disclosure. The exemplary computer system 700 of FIG. 7 may be used to implement the components of FIG. 1, including user device 102, content server 120, and host server 130.

As shown in FIG. 7, computer system 700 includes one or more processors, such as processor 702. Processor 702 is connected to a communications infrastructure 706, such as a bus or network (e.g., communications network 110 of FIG. 1).

Computer system 700 also includes a main memory 708, for example, a random access memory (RAM), and may include a secondary memory 710. Secondary memory 710 may include, for example, a hard disk drive 712 and/or a removable storage drive 714, representing a magnetic tape drive, an optical disk drive, CD/DVD drive, etc. Removable storage drive 714 reads from and/or writes to a removable storage unit 718 in a well-known manner. Removable storage unit 718 represents a magnetic tape, optical disk, or other non-transitory computer-readable storage medium that is read by and written to by removable storage drive 714. As will be appreciated, the removable storage unit 718 can represent a non-transitory computer-readable medium having stored therein computer programs, sets of instructions, code, or data to be executed by processor 702.

In alternate embodiments, secondary memory 710 may include other means for allowing computer programs or sets of instructions to be loaded into computer system 700. Such means may include, for example, a removable storage unit 722 and an interface 720. An example of such means may include a removable memory chip (e.g., EPROM, RAM, ROM, DRAM, EEPROM, flash memory devices, or other volatile or nonvolatile memory devices) and an associated socket, or other removable storage units 722 and interfaces 720, which allow instructions and data to be transferred from removable storage unit 722 to computer system 700.

Computer system 700 may also include one or more communications interfaces, such as communications interface 724. Communications interface 724 allows computer software, instructions, and/or data to be transferred between computer system 700 and external devices. Examples of communications interface 724 may include a modem, a network interface (e.g., an Ethernet card), a communications port, PCMCIA slot and card, a wireless transmitter or card, etc. Computer software, instructions, and/or data may be transferred via communications interface 724 in the form of signals (not shown), which may be electronic, electromagnetic, optical, or other signals capable of being received by communications interface 724. These signals 726 are provided to communications interface 724 via a communications path (i.e., channel 728). Channel 728 carries signals 726 and may be implemented using wire or cable, fiber optics, an RF link, wireless transmissions, and other communications channels. In another embodiment, signals 726 comprise data packets sent to processor 702. Information representing processed packets can also be sent in the form of signals 726 from processor 702 through channel 728.

The terms "storage device" and "storage medium" may refer to particular devices including, but not limited to, main memory 708, secondary memory 710, a hard disk installed in hard disk drive 712, and removable storage units 718 and 722. Further, the term "non-transitory computer-readable medium" may refer to devices including, but not limited to, a hard disk installed in hard disk drive 712, any combination of main memory 708 and secondary memory 710, and removable storage units 718 and 722, which respectively provide computer programs and/or sets of instructions to processor 702 of computer system 700. Such computer programs and sets of instructions can be stored within one or more non-transitory computer-readable media. Additionally, or alternatively, computer programs and sets of instructions may also be received via communications interface 724 and stored on the one or more computer-readable media.

Such computer programs and instructions, when executed by processor 702, enable processor 702 to perform one or more of the computer-implemented methods described herein. Examples of program instructions include, for example, machine code, such as code produced by a compiler, and files containing a high-level code that can be executed by processor 702 using an interpreter.

The computer-implemented methods described herein can also be implemented on a single processor of a computer system, such as processor 702 of system 700. In another embodiment, computer-implemented methods consistent with embodiments of the present disclosure may be implemented using one or more processors within a single computer system, and additionally or alternatively, these computer-implemented methods may be implemented on one or more processors within separate computer systems linked via a network.

Various embodiments have been described herein with reference to the accompanying drawings. It will, however, be evident that various modifications and changes may be made thereto, and additional embodiments may be implemented, without departing from the scope of the present disclosure or the subject matter as set forth in the claims that follow.

Further, other embodiments will be apparent to those skilled in the art from consideration of the specification and practice of one or more embodiments disclosed herein. It is intended, therefore, that this disclosure and the embodiments herein be considered as exemplary only, with a true scope and spirit of the present disclosure being indicated by the following listing of exemplary claims.

What is claimed is:

1. A computer-implemented method for providing content groups for electronic content, the method comprising:

transmitting authentication information from a host server to at least one content server in order to access source data at a source of record;

receiving source data from the at least one content server based on the at least one content server validating the authentication information, the source data comprising electric content consisting of one or more of: messages, contact lists, or RSS feeds;

generating, with at least one processor, local data based on at least one of an analysis of the received source data or an extraction from the received source data and wherein the local data comprises one or more of: message skeletons, metadata, or an extracted attachment;

classifying, with the at least one processor, the electronic content as being associated with one or more content groups according to a set of rules, the set of rules created and trained by a learning algorithm model;

generating, based on the local data, representations of the electronic content and the associated one or more content groups, the representations including permitted interactions;

generating instructions to display, in an order based on modification date, at least one content stack on a user interface, each displayed content stack comprising the representations of the electronic content and the associated one or more content groups; and based on new source data including electronic content not associated with the one or more content groups, generating a new content group according to a new set of rules.

2. The computer-implemented method of claim 1, for providing content stacks for electronic content, the method further comprising:

detecting, with at least one processor, a user interaction with the user interface by comparing cursor coordinates with coordinates of an electronic message, an inbox area, or a content stack.

3. The computer-implemented method of claim 2, for providing content stacks for electronic content, the method further comprising:

determining if the detected user interaction corresponds to (i) a dragging of at least one electronic message from the inbox area to an empty content stack in the content stack area or (ii) a dragging of at least one electronic message from the inbox area to an existing content stack in the content stack area.

4. The computer-implemented method of claim 1, for providing content stacks for electronic content, the method further comprising:

generating at least one customized pop-up dialog based on the set of rules.

5. The computer-implemented method of claim 4, wherein the at least one customized pop-up dialog provides an option to associate additional electronic messages, that satisfy the set of rules, in a new pinned content stack.

6. The computer-implemented method of claim 1, for providing content stacks for electronic content, the method further comprising:

determining whether the electronic content includes an attachment; and generating a thumbnail image or icon representation of the attachment upon determining that the electronic content includes an attachment.

7. The computer-implemented method of claim 1, wherein the set of rules includes information that identifies a sender or a recipient for filtering additional electronic messages.

8. A system for providing content stacks for electronic content, the system comprising:

at least one processor; and a storage device that stores a set of instructions, the set of instructions being executable by the at least one processor to cause the at least one processor to implement steps for:

transmitting authentication information from a host server to at least one content server in order to access source data at a source of record;

receiving source data from at least one content server based on the at least one content server validating the authentication information, the source data comprising electronic content consisting of one or more of: messages, contact lists, or RSS feeds;

generating, with at least one processor, local data based on at least one of an analysis of the received source data or an extraction from the received source data and wherein the local data comprises one or more of: message skeletons, metadata, or an extracted attachment;

classifying, with the at least one processor, the electronic content as being associated with one or more content groups according to a set of rules, the set of rules created and trained by a learning algorithm model;

generating, based on the local data, representations of the electronic content and the associated one or more content groups, the representations including permitted interactions;

generating instructions to display, in an order based on modification date, at least one content stack on a user interface, each displayed content stack comprising the representations of the electronic content and the associated one or more content groups; and based on new source data including electronic content not associated with the one or more content groups, generating a new content group according to a new set of rules.

9. The system of claim 8, for providing content stacks for electronic content, the processor being further implemented to perform the step of:

detecting, with at least one processor, a user interaction with the user interface by comparing cursor coordinates with coordinates of an electronic message, an inbox area, or a content stack.

10. The system of claim 9, for providing content stacks for electronic content, the processor being further implemented to perform the step of:

determining if the detected user interaction corresponds to (i) a dragging of at least one electronic message from the inbox area to an empty content stack in the content stack area or (ii) a dragging of at least one electronic message from the inbox area to an existing content stack in the content stack area.

11. The system of claim 8, for providing content stacks for electronic content, the processor being further implemented to perform the step of:

generating at least one customized pop-up dialog based on the set of rules.

12. The system of claim 11, wherein the at least one customized pop-up dialog provides an option to associate additional electronic messages, that satisfy the set of rules, in a new pinned content stack.

13. The system of claim 8, for providing content stacks for electronic content, the processor being further implemented to perform the step of:

determining whether the electronic content includes an attachment; and generating a thumbnail image or icon representation of the attachment upon determining that the electronic content includes an attachment.

14. The system of claim 8, wherein the set of rules includes information that identifies a sender or a recipient for filtering additional electronic messages.

15. A non-transitory computer-readable medium storing a set of instructions for providing content stacks for electronic content, that, when executed by at least one processor, causes the at least one processor to implement steps for:

transmitting authentication information from a host server to at least one content server in order to access source data at a source of record;

receiving source data from at least one content server based on the at least one content server validating the authentication information, the source data comprising electronic content consisting of one or more of: messages, contact lists, or RSS feeds;

generating, with at least one processor, local data based on at least one of an analysis of the received source data or an extraction from the received source data and wherein the local data comprises one or more of: message skeletons, metadata, or an extracted attachment;

classifying, with the at least one processor, the electronic content as being associated with one or more content groups according to a set of rules, the set of rules created and trained by a learning algorithm model;

generating, based on the local data, representations of the electronic content and the associated one or more content groups, the representations including permitted interactions;

generating instructions to display, in an order based on modification date, at least one content stack on a user interface, each displayed content stack comprising the representations of the electronic content and the associated one or more content groups; and based on new source data including electronic content not associated with the one or more content groups, generating a new content group according to a new set of rules.

16. The non-transitory computer-readable medium of claim 15, for providing content stacks for electronic content, the non-transitory computer-readable medium further storing instructions for:

detecting, with at least one processor, a user interaction with the user interface by comparing cursor coordinates with coordinates of an electronic message, an inbox area, or a content stack.

17. The non-transitory computer-readable medium of claim 16, for providing content stacks for electronic content, the non-transitory computer-readable medium further storing instructions for:

determining if the detected user interaction corresponds to (i) a dragging of at least one electronic message from the inbox area to an empty content stack in the content stack area or (ii) a dragging of at least one electronic message from the inbox area to an existing content stack in the content stack area.

18. The non-transitory computer-readable medium of claim 15, for providing content stacks for electronic content, the non-transitory computer-readable medium further storing instructions for:

generating at least one customized pop-up dialog based on the set of rules.

19. The non-transitory computer-readable medium of claim 18, wherein the at least one customized pop-up dialog provides an option to associate additional electronic messages, that satisfy the set of rules, in a new pinned content stack.

20. The non-transitory computer-readable medium of claim 15, for providing content stacks for electronic content, the non-transitory computer-readable medium further comprising:

determining whether the electronic content includes an attachment; and generating a thumbnail image or icon representation of the attachment upon determining that the electronic content includes an attachment.

* * * * *